No. 667,378. Patented Feb. 5, 1901.
A. G. WATERHOUSE.
APPARATUS FOR RAISING AND STERILIZING WATER.
(Application filed Apr. 5, 1900.)
(No Model.)

Witnesses
Geo. L. G. Waterhouse.
W. S. Watson

Inventor
Addison G. Waterhouse.

UNITED STATES PATENT OFFICE.

ADDISON G. WATERHOUSE, OF SPRINGFIELD, PENNSYLVANIA.

APPARATUS FOR RAISING AND STERILIZING WATER.

SPECIFICATION forming part of Letters Patent No. 667,378, dated February 5, 1901.

Application filed April 5, 1900. Serial No. 11,718. (No model.)

*To all whom it may concern:*

Be it known that I, ADDISON G. WATERHOUSE, a citizen of the United States, residing in the township of Springfield, county of Delaware, State of Pennsylvania, have invented new and useful Improvements in Steam and Vacuum Water-Elevators, of which the following is a specification.

My invention relates to that class of water-elevators whereby water is expelled from the apparatus under pressure by being directly displaced by steam and drawn into the apparatus by a partial vacuum produced by the condensation of the steam.

The object of my invention is to produce an apparatus which will be efficient and economical in operation and adapted for elevating or forcing water into a closed conducting-pipe or a receiving-tank against a constant pressure.

My invention essentially consists of means for applying steam or heat which will form steam to water confined within a closed pumping-chamber and by the pressure of such steam upon the surface of the water expel the same by displacement and force it into a pipe at any pressure corresponding to the pressure of steam applied to it, then holding the water under pressure in the conducting-pipe and preventing its return to the pumping-chamber, and then allowing part of the steam to escape from the pumping-chamber and causing a limited amount of cool water under pressure to flow into the same, thereby condensing the steam within the pumping-chamber and creating a partial vacuum therein, by means of which the pumping-chamber is refilled with water.

My invention also embraces means for conserving the heat employed by transferring it from the water flowing from the pumping-chamber to the water flowing toward the same, so that the same heat is used over and over again.

In order to describe my invention, reference will be had to the accompanying drawings, in which—

Figure 1:
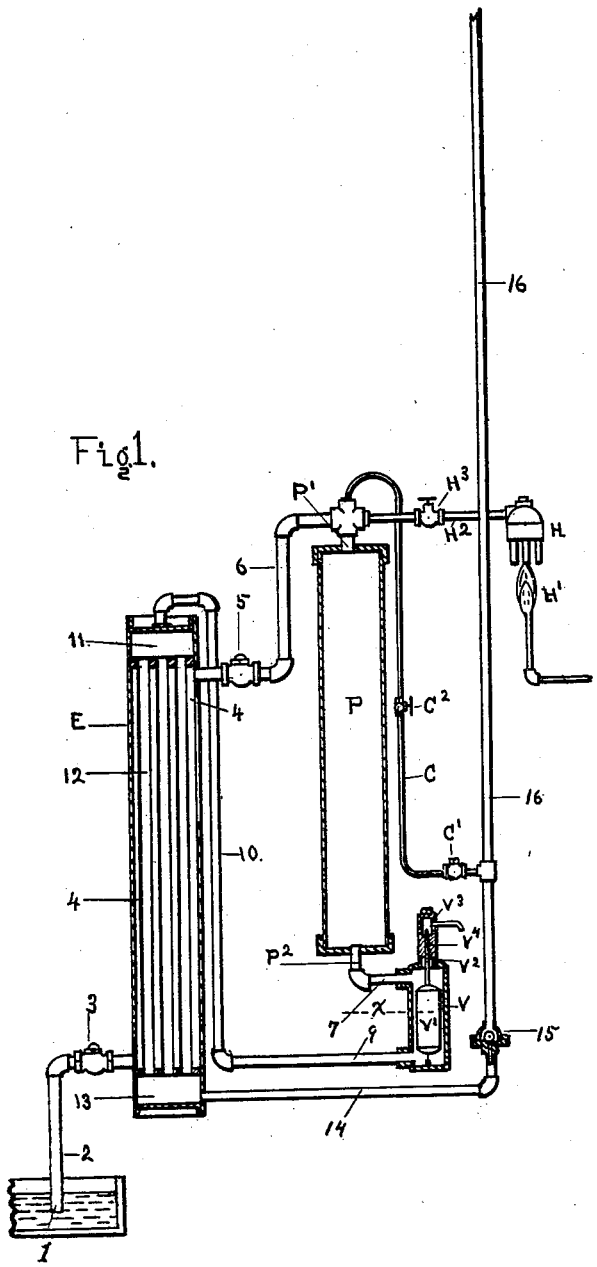
Figure 2:
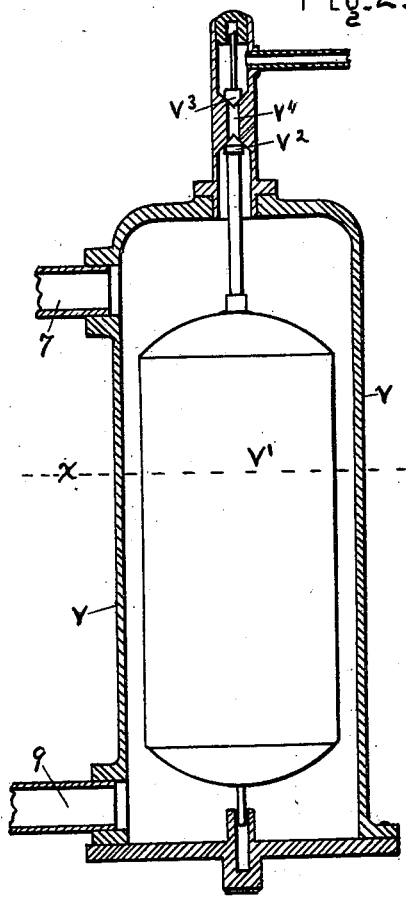

Figure 1 is a sectional elevation of an apparatus embodying the essential features of my invention. Fig. 2 is a detail.

Fig. 1 shows an apparatus consisting of the following parts, in which P is a pumping-chamber having the form of a closed cylinder, with a length preferably much greater than its diameter, or it may be composed of several cylinders or chambers connected together by pipes. At the top of this chamber P is an inlet P', through which the supply-water enters when drawn from the source of supply. (Represented by 1.) This pipe P' may enter the chamber P any place. At the bottom of this pumping-chamber P is an outlet-passage P², through which the water is expelled indirectly into the conducting-pipe 16.

V is a priming-valve actuated by a float, which acts as a water-trap and allows the escape of steam, but prevents the escape of water. This valve will be better understood by referring to Fig. 2, in which V is composed of an outer shell closed at both ends. It has two openings, into which the pipes 7 and 9 are screwed. The top of the valve V has a blow-off valve consisting of an aperture $V^4$, which is closed at its upper end by the check-valve $V^3$, which will allow steam to pass out from under it and prevent air from returning when a vacuum is formed. At the lower end of the aperture $V^4$ is a valve $V^2$, which when raised closes the aperture and prevents water or steam from escaping from the shell V. V' is a float connected to the valve $V^2$. When the shell V is filled with water, the float V' is raised up and the aperture $V^4$ is closed; but when the surface of the water in V falls below the dot-lines X the float V' moves down, and this carries the valve $V^2$ away from its seat and allows the steam which is above the surface of the water and also that in the chamber P to escape through the aperture $V^4$.

Referring back to Fig. 1, E is a heat-exchange, consisting of a vessel having two separate passages or compartments through which water can pass. These two compartments being thermally connected or contiguous allow the heat in the water of one compartment to be transferred by conduction to the cooler water in the other compartment. The heat-exchange shown is made in the form of a tubular boiler having two separate compartments, one being formed by the two end chambers 11 and 13 and the interior of the tubes 12, which connect these two end chambers, while the other compartment 4 is formed by the inclosed space outside of the tubes 12 and between the chambers 11 and 13 and inside of the outer shell of E. In place of this form of heat-exchange any other form will do which will transfer the heat from the hot to the cold water.

H is a steam-generator consisting of a closed vessel for holding water and is connected to the pumping-chamber P by means of the pipe $H^2$. This generator H is formed so that heat can be applied to it, as represented by the flame $H'$. The object of H is to generate steam, which, passing through pipe $H^2$, enters the pumping-chamber P.

The pipes and valves belonging to this apparatus are as follows, beginning at the source of supply 1: The supply-pipe 2, with check-valve 3, leads to the lower end of compartment 4 of the heat-exchange E. From the upper end of this compartment 4 the pipe 6 extends to the inlet $P'$ of the pumping-chamber P. This pipe 6 may have a check-valve 5; but this valve is not essential, as valve 3 is in the same passage and prevents the return of the supply-water. The discharge-water is carried from the bottom of P through $P^2$ and pipe 7 to the shell of the priming-valve V, through which it passes, and then out pipe 9, up pipe 10 into the heat-exchange E, through the compartment formed by chamber 11, tubes 12, and chamber 13, then out through pipe 14, check-valve 15, and into the conducting-pipe 16.

C is a condensing-tube leading from the conducting-pipe 16 above its check-valve 15 into the top of the pumping-chamber P. This tube C has a regulating-cock $C^2$ and a check-valve $C'$.

The operation of this apparatus is as follows: To start, all parts are first filled with water. Heat $H'$ is applied to the generator H until steam is generated in H. This steam passes through pipe $H^2$ into the top of P, and after heating the surface of the water in P condensation stops. Then the steam-pressure rises and by pressing upon the surface of the water in P forces it out, through the outlet $P^2$, by way of valve V, one of the compartments of the heat-exchange E and then out through pipe 14 into the conducting-pipe 16, where it is held by the check-valve 15. As soon as the water is all forced from the pumping-chamber P and partly from the priming-valve V until its surface reaches the dot-line X it then fails to support the float $V'$, so that the float moves down and opens the valve $V^2$. This allows the steam in V, and that in P also, to escape through the aperture $V^4$, which escape, lowering the pressure of the steam slightly, allows a limited jet of water to flow back through the pipe C from the pipe 16 into the top of P, and this inflowing jet condenses the steam which had not escaped, thereby creating a partial vacuum in P, also in H and V. Then the check-valve $V^3$ closes and prevents the air from entering and destroying this vacuum in chamber P, which results in lifting water from the source of supply 1 through pipe 2, check-valve 3, and compartment 4 of the heat-exchange E and pipe 6 into the chamber P and generator H until all parts of the apparatus are refilled, and as V is refilled and the float $V'$ rises and closes the valve $V^2$ the apparatus is again ready for another action. While the apparatus is drawing in a supply of water the check-valve $V^3$ prevents air from entering into V, and the regulating-valve $C^2$ can be adjusted so that little more water will return from pipe 16 than is enough to condense the steam. After the apparatus is filled no more can flow in through tube C, and after the steam-pressure is again established the check-valve $C'$ will prevent any steam or water from passing through tube C to the pipe 16.

The purpose of the heat-exchange E is to conserve heat by conducting the heat from the water flowing from to the water flowing toward the pumping-chamber P, thereby obtaining a degree of economy in operating the apparatus; but in all cases where this exchange is not necessary or practicable it can be left out. Then the supply-pipe 2, with its check-valve 3, can be connected directly to the pumping-chamber P, while the discharge-pipe 9 can run directly from the valve V to the conducting-pipe 16 below its check-valve 15. I have shown this valve V separated from the pumping-chamber P; but it is obvious that the two can be formed as a single part of the apparatus.

By reducing the size of the generator H so that it will barely hold enough water to supply sufficient steam for each action a degree of economy is obtained from the fact that but a small quantity of water has to be heated before steam is generated therefrom and but little water is left in it from which steam can be drawn and wasted during the short period in which a partial vacuum exists in the pumping-chamber P until it is refilled with water, and in case steam is fed from a boiler through the pipe $H^2$, I provide it with a regulating-valve $H^3$, so that but a small amount of steam can enter, which will expel the water from the pumping-chamber P slowly and allow but little steam to pass to the pumping-chamber P during the short interval in which its steam is being condensed and it is being refilled with water.

I am aware that steam and vacuum water elevators have been made and used having a pumping-chamber into which water has been drawn and from which it has been expelled by means of the pressure and condensation of steam within the same; but in such cases the pressure of steam has only been reduced by causing the steam to follow the water in the discharge-pipe and by forcing the water therefrom find a free passage for the steam, so that its pressure in the pumping-chamber would lower and allow the inflow of condensing-water. To accomplish this, the discharge-pipe must have an open discharge out of which the water can be ejected in order to admit of the free escape of steam. This fact would preclude the use of the apparatus in all cases where water was to be forced into pressure-pipes or into a closed passage or chamber against a constant pressure. To avoid this objection, I employ the priming-valve V for blowing off the steam after it has done the work of expelling the water from P, so that the condensing-water is free to enter the pumping-chamber, while the pressure of water in the discharge or conducting pipe 16 remains constant.

What I claim as my invention is—

1. In an apparatus for raising water, the combination of a pumping-chamber, into which water is drawn and from which it is expelled by the alternate pressure and condensation of steam therein; a supply pipe or passage provided with a check-valve, through which water is drawn from a source of supply into the pumping-chamber; a conducting pipe or passage provided with a check-valve and leading from the bottom of the pumping-chamber to where the water is forced; a priming-valve for blowing off steam from the pumping-chamber after it has expelled the water therefrom; a condensing-tube provided with a check-valve, offering a passage for a limited jet of water, from a point, in the conducting-pipe beyond its check-valve, to the pumping-chamber, and a steam-pipe leading from a steam-generator, to the top of the pumping-chamber—substantially as and for the purposes set forth.

2. In a water-raising apparatus, consisting of a pumping-chamber, provided with a steam-pipe leading from a steam-generator; a condensing-tube for conducting a limited supply of water, under pressure, into the pumping-chamber, and a priming-valve, for allowing the escape of steam from the pumping-chamber; after the water has been ejected therefrom; in combination with a heat-exchange having two separate passages or compartments, in thermal contact with each other, through each of which the water passes on its way to and from the pumping-chamber, substantially as and for the purposes set forth.

3. In a water-raising apparatus; the combination of a pumping-chamber, provided with a steam-pipe, leading from a steam-generator, and a condensing-tube for conducting a limited supply of water, under pressure, into the pumping-chamber, wherein water is drawn, from a source of supply and ejected into a conducting-pipe, by the alternate pressure and condensation of steam, and a priming-valve consisting of a closed chamber, through which the water from the pumping-chamber passes; having a float for actuating a valve, for allowing the escape of steam and preventing that of the water, through an aperture leading from the priming-valve and a check-valve for preventing air from entering the aperture, substantially as and for the purposes set forth.

ADDISON G. WATERHOUSE.

Witnesses:
RICHARD YOUNG,
GEO. L. G. WATERHOUSE.